United States Patent

[11] 3,610,900

| [72] | Inventor | Manik Talwani<br>Valley Cottage, N.Y. |
|---|---|---|
| [21] | Appl. No. | 879,469 |
| [22] | Filed | Nov. 24, 1969 |
| [45] | Patented | Oct. 5, 1971 |
| [73] | Assignee | The United States of America as represented by the Secretary of the Navy |

[54] CROSSCOUPLING COMPUTER
6 Claims, 7 Drawing Figs.

[52] U.S. Cl. .................................................. 235/151.3,
73/382, 235/150.26
[51] Int. Cl. ........................................................ G01m 1/12,
G06g 7/78
[50] Field of Search .......................................... 73/382;
235/150.26, 150.27, 151.3; 346/8

[56] References Cited
UNITED STATES PATENTS
3,474,672  10/1969  La Coste et al. .............  73/382

*Primary Examiner*—Malcolm A. Morrison
*Assistant Examiner*—Edward J. Wise
*Attorneys*—R. I. Tompkins, L. I. Shrago and R. K. Tendler ABSTRACT: A crosscoupling computer is disclosed which generates a signal that is subtracted from the output of a highly damped beam gravimeter to eliminate the crosscoupling acceleration errors introduced into the gravity measuring system by horizontal forces acting on the beam. In gravity measurements made at sea, these forces are produced by the motion of the ship in which the gravimeter is mounted.

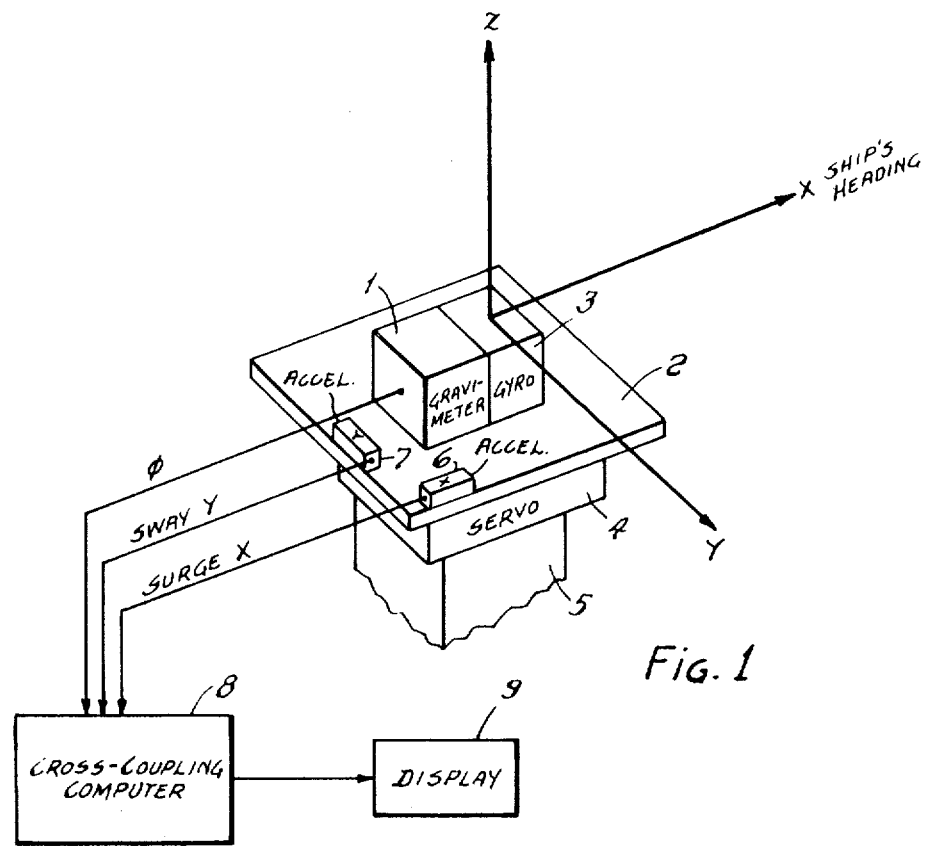
Fig. 1
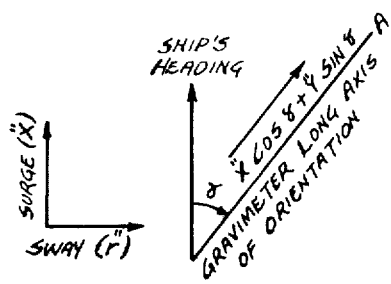
Fig. 2
Fig. 3
CROSS COUPLING = $(\ddot{X}\cos\gamma + \ddot{Y}\sin\gamma)\sin\phi$

CROSSCOUPLING COMPUTER

The invention described herein may be manufactured and used by or for the Government of the United States of America for governmental purposes without the payment of any royalties thereon and therefor.

This invention relates to the measurement of local gravitational fields at sea and, more particularly, to a continuous analog computer which produces a signal representing the crosscoupling error introduced into measurements of gravity by a beam gravimeter mounted on a gyrostabilized platform. LaCoste and Harrison pointed out in the 1961 that for a highly damped beam gravimeter mounted on a stable platform the errors due to crosscoupling could be significant. The magnitude of the crosscoupling effect depends on the horizontal and vertical accelerations to which the beam gravimeter is subjected as well as the phase relation between the horizontal and vertical accelerations and the dynamic sensitivity of the gravity meter. This crosscoupling effect arises from relatively short term motions of the vessel in which the gravimeter is mounted. These short term forces are generated by sea swell and wave action, whose time duration can range anywhere from one second to several tens of minutes. The crosscoupling acceleration period is generally divided into three ranges. The lowest period ranges from about 1 to 10 seconds and corresponds to twice the frequency of sea motion which gives rise to the crosscoupling. These periods are prominent in the instantaneous crosscoupling but almost disappear after subsequent low-pass filtering. At the other end of the spectrum are crosscoupling accelerations with periods ranging from several tens of minutes to a DC steady rate. These accelerations are indistinguishable from gravity on the gravimeter records. Their amplitudes depend on the sea state and on the angle of approach of sea and swell. Between these two extremes lie crosscoupling accelerations with periods ranging from a few tens of seconds to perhaps 10 or 15 minutes. In simplest terms, their periods can be thought of as arising from the time intervals at which groups of waves arrive at the ship. The crosscoupling accelerations in this range appear as characteristic wobbles in a graphic recording thereof. Accelerations having a duration in any one of these three categories are removed by the subject crosscoupling computer which produces a signal that is subtracted from the signal from the beam gravimeter. In doing so, those vertical accelerations due to the crosscoupling effect are eliminated from the gravity measuring system.

The present invention is an improvement on the analog computer disclosed in the Journal of Geophysical Research, Vol. 71, No. 8, which appeared on Apr. 15, 1966. The improvements to this system include measurement of a different parameter, i.e., beam deflection angle, the use of the better filters which do not significantly distort the voltage signals corresponding to accelerations and gravimeter beam motions and which include allowance for the fact that the beam motions are not entirely rotational but are also translational. Circuitry is also provided to correct the gravimeter output in real time for the crosscoupling error by appropriate analog subtraction. A system utilizing these components in the manner to be described results in elimination of crosscoupling effects to a point well below 1 milligal. Since the accuracy of present gravimeters is on the order of 1 milligal, the present analog computation system permits measurement of local gravitational fields at sea to within the accuracy of the gravimeter unaffected by the motion of the ship.

In a recent study, it has been ascertained that the errors due to crosscoupling may exceed 15 milligals. While these accelerations are orders of magnitude less than the vertical accelerations due to heave of the ship, errors of this magnitude are important since, unlike heave accelerations, they are not equally positive and negative and therefore cannot be cancelled from the gravity measuring system by filtering.

It is therefore an object of this invention to provide an analog computing system which provides a signal corresponding to the crosscoupling error encountered when a beam gravimeter mounted on a stable platform is subjected to motions of the ship in which it is mounted.

It is a further object of this invention to provide an analog computing system which considers and allows for the translation as well as rotation of the gravimeter beam in response to the heave accelerations in computing the crosscoupling error or correction.

It is a further object of this invention to provide an improved set of low-pass and high-pass filters which afford a minimum distortion of signals with periods lying between 1 and 20 sec.

It is a still further object of this invention to provide complete cancellation of the crosscoupling error induced in gravity measurements by making a subtraction of an analog signal corresponding to the crosscoupling error from the output signal of the gravimeter, in real time.

Other objects, advantages and novel features of the invention will become apparent from the following detailed description thereof when considered in conjunction with the accompanying drawings in which like numerals represent like parts through and wherein:

FIG. 1 is a diagrammatic representation of a gravimeter situated on a gyrostabilized platform and includes a showing of the crosscoupling computer and display device;

FIG. 2 is a graph showing the relationship between the longitudinal axis of a beam gravimeter and accelerations incident thereon in the surge and sway directions;

FIG. 3 is a diagram showing the relationship between the crosscoupling acceleration and the angle that the beam of the gravimeter makes with a local horizontal;

Figure 4:
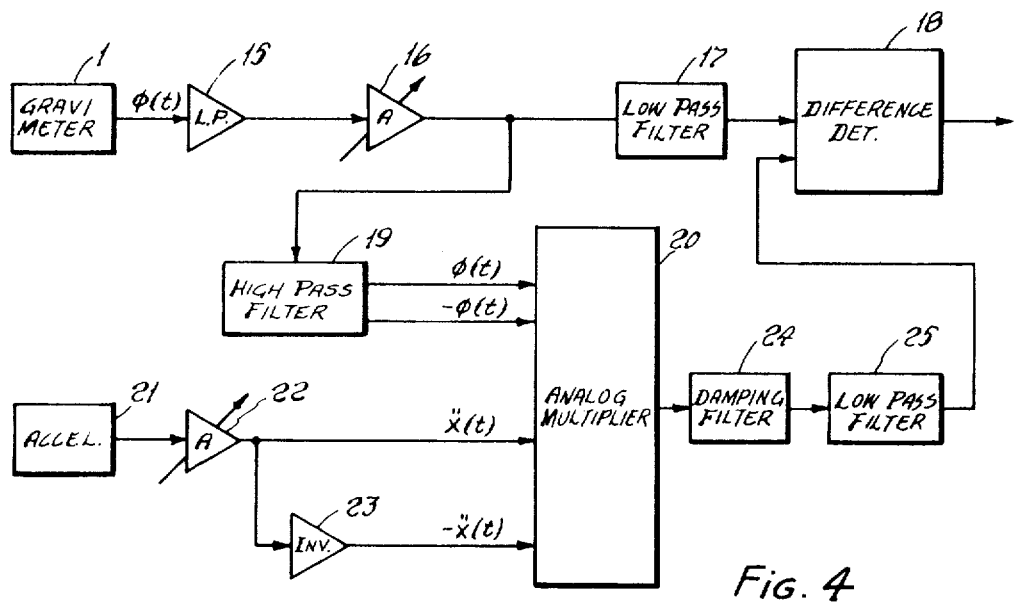
FIG. 4 is a schematic block diagram of the improved crosscoupling computer showing the matched filters, the analog multiplier and means for introducing signals to be multiplied thereby.

Referring to FIG. 1, a beam gravimeter 1 is shown mounted on a gyrostabilized platform 2. Gyroscope 3 and servomechanism 4 mounted atop supporting member 5 serve to maintain stabilized platform 2 in a reference plane defined by coordinate axes X and Y. The X-direction is defined as the ship's heading, and the beam of the gravimeter, in one configuration, is aligned along this direction. In another configuration, the beam of the gravimeter may be aligned with the Y-axis, that is, athwartship. The vertical direction is shown by the Z-axis as being perpendicular to the plane defined by the above-mentioned orthogonal axes. Mounted on the stable platform are accelerometers 6 and 7 which provide signals indicating accelerations in the surge and sway directions. The surge direction is defined as being colinear with the X-axis and the sway direction is defined as being colinear with the Y-axis. Signals from the gravimeter and accelerometers are shown coupled to crosscoupling computer 8 which is in turn coupled to a suitable display device 9. This display device is a strip chart recorder which graphs the amplitude of the gravimeter signal against time. When the beam of the gravimeter is aligned with the X-axis, crosscoupling due to sway of the research vessel in which the gravimeter is mounted is negligible.

Referring to FIG. 2, in general, when a beam gravimeter is mounted on a stable platform, the long axis of the meter is shown to make an angle $\gamma$ with the direction of the ship's heading. The gravimeter beam is constrained to move through small angles about the horizontal in a plane defined by the above vertical axis and the longitudinal axis of the meter. Assuming that the center of gravity of the beam lies between A of FIG. 2 and its hinge point, the surge acceleration $\ddot{x}$ is defined positive in the forward direction and the sway acceleration $\ddot{y}$ is positive in the starboard direction. The horizontal acceleration along the length of the beam is given by $\ddot{x} \cos \gamma + \ddot{y} \sin \gamma$. If the meter beam is deflected through an angle $\Phi$, as shown in FIG. 3, considered positive in the downward sense, then the instantaneous crosscoupling acceleration, which in the simplest sense can be considered the component of the horizontal acceleration normal to the beam, equals $(\ddot{x}\cos\gamma+\ddot{y}\sin\gamma)\sin\Phi$; and since $\Phi$ is small the above expression can be rewritten as $\ddot{x}\Phi\cos\gamma+\ddot{y}\Phi\sin\gamma$. The gravimeter beam measures the components of all accelerations that are normal to it and in its plane of motion. Therefore, the beam position will be affected by this crosscoupling acceleration. The quantity $\ddot{x}\Phi$ represents the value of crosscoupling if $\gamma$ equals zero, that is, if the longitudinal axis of the meter is along the fore and aft direction of the ship with the hinge point aft of the center of gravity of the beam. This is to say that point A is forward. The surge crosscoupling is defined as being equal to $\ddot{x}\Phi$. Similarly, the sway crosscoupling is equal to $\ddot{y}\Phi$ if the longitudinal axis of the meter is athwartship. If the values of surge and sway crosscoupling are known, the value of crosscoupling for any orientation of the meter on the stabilized platform is easily determined.

In designing an analog computer to determine $\ddot{x}\Phi$, there are two methods by which $\Phi$ can be obtained. In one method, it can be directly obtained as the unfiltered signal for the gravimeter beam deflection. This is the technique used in the present invention since it yields a significantly more accurate computation of the crosscoupling for the particular gravimeter used. In the other method referred to in the 1966 article, $\Phi$ is obtained by analog techniques from the heave acceleration. $\ddot{x}$ is obtained in both cases from one of the accelerometers mentioned above.

In the present system, $\Phi$ is developed directly as the beam angle mentioned above. In the gravimeter contemplated, large time constants which necessarily have an averaging effect are inherent. Therefore, only those terms in $\ddot{x}\Phi$ that have a non-zero time average are considered. If $\Phi$ is considered the sum of $\Phi_0$ and $\Phi_1$, then $\Phi_1$ has periods in the range of periods of sea motions, and $\Phi_0$ has longer periods which can be considered essentially a DC term. Assuming that the horizontal acceleration $\ddot{x}$ has periods only in the range of periods in sea motion, $\ddot{x}\Phi_0$ averages out and the only term which is considered is $\ddot{x}\Phi_1$. In this case, if the DC or long-period terms are removed from $\ddot{x}$ and $\Phi$ by passing their signals through high-pass filters, retaining only the short period terms before multiplying, no errors will result. The fact that $\ddot{x}\Phi_1$ gives a crosscoupling effect and the fact that it is not necessary to compute $\ddot{x}\Phi$ are of practical use, especially if $\Phi$ is not taken directly from the gravimeter beam signal but is generated by analog means.

In the subject system, $\Phi_1$ is taken from the gravimeter and then amplified considerably. Changes in gravity detected by the beam gravimeter are also amplified. Hence, the resulting signal consists of $\Phi_1$ with a large DC voltage superimposed on it. In theory, the DC voltage should not cause any errors because it is multiplied by $\ddot{x}$ and the resulting term has a zero time average. In practice, however, the DC voltage superimposed on $\Phi_1$ may drive the amplifiers and the multiplier in the crosscoupling computer out of their operating range. Further, if the surge acceleration signal $\ddot{x}$ has any small DC voltage, due to drift of the accelerometer or DC off level of the platform superimposed on it, this DC error voltage may give rise to a large DC error in crosscoupling when multiplied by the DC voltage superimposed on $\Phi_1$. The high-pass filter discussed later eliminates DC voltages corresponding to $\Phi_0$. High-pass filtering in the subject system is justified if the actual long-period terms in $\ddot{x}$ due to slowing down or speeding up of the ship are so small that, even at the maximum value of $\Phi_0$, the resultant crosscoupling terms are negligible.

FIG. 4 shows a block diagram of the crosscoupling computer shown in FIG. 1. Gravimeter 1 is shown coupled to a pair of operational amplifiers 15 and 16. The first of these operational amplifiers which has an RC circuit feedback operates a low-pass filter in addition to amplifying the signal from the gravimeter. This RC filter with a small time constant serves to compensate for the translation of the beam in one type of gravimeter, called the Graf-Askania Gss2 gravimeter, in addition to compensating for rotational errors when the beam is subjected to short vertical term accelerations. Amplifier 16 has an amplitude variable output which can be set to obtain a given scale factor between volts and milligals. The signal from amplifier 16 is coupled to a low-pass filter 17 which also contains an operational amplifier. This low-pass filter removes from the gravimeter signal accelerations due to heave of the research vessel and passes a signal to difference detector 18. This signal represents the local gravitational field and includes acceleration due to crosscoupling. The signal from amplifier 16 is also coupled to a unique high-pass filter which filters out long term periodic fluctuations of gravimeter signals and produces two signals, one of which representing the beam angle $\Phi_1$ and the other its inverted counterpart. These two signals are coupled to an analog multiplier 20. This multiplier is a commercially available device which is capable of multiplying two quantities and yielding a product with the appropriate sign. The other inputs to multiplier 20 are derived from the surge signal from either accelerometer 6 or 7. These accelerometers are represented by the single accelerometer shown at 21. The signal from this accelerometer is amplified by an amplifier 22. One output of this amplifier is coupled directly to the analog multiplier while a portion of this signal is phase-inverted by operational amplifier 23 and is subsequently coupled to multiplier 20 to complete its inputs. The output to multiplier 20 is filtered at 24 so as to analog or simulate the effect of the high damping of the gravimeter on the gravity signal. For the Graf-Askania gravimeter, a simple RC-type low-pass filter is adequate to analog the damping of the gravimeter. Thereafter, this filtered signal is again filtered by a low-pass filter 25 which corresponds exactly to low-pass filter 17. This low-pass filter serves to filter the continuous analog crosscoupling acceleration signal to the same extent that the gravimeter signal is filtered by low-pass filter 17. The output of low-pass filter 25 is coupled to difference detector 18 which is any conventional device which inverts one of the signals thereto and adds it to the other while preserving waveform and amplitude. The output of this detector is coupled to display device 9 shown in FIG. 1.

It will be appreciated that if there is no DC in the accelerometer output the high-pass filtering section can be omitted. Under normal conditions the DC output can be made adequately low by monitoring the long term level of the platform, and keeping it within 1' of arc of the horizontal, and by selecting accelerometers with low drift.

It will also be appreciated that the other types of multipliers can be used instead of the one described here. For example, magnetic multipliers which use only two inputs instead of four can be used. Such multipliers do not require inputs with inverted phases as are required by the multiplier described above.

Figure 5:
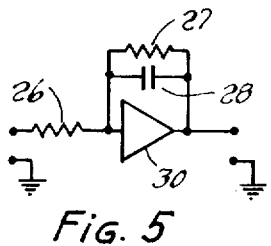
FIG. 5 is a schematic diagram of one of the matched low-pass filters which utilizes an operational amplifier and attendant RC feedback circuitry.

FIG. 5 is a block diagram of an operational amplifier 30 which serves as a low-pass or damping filter. This low-pass filter serves to analog the mechanical filtering by the gravimeter. The circuit in FIG. 5 can be suitably altered to analog the damping function of any particular gravimeter.

Figure 6:
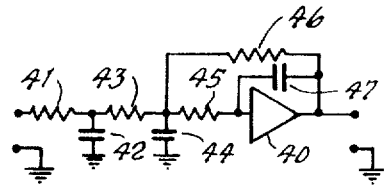
FIG. 6 is a schematic diagram of another type of low-pass filter used in conjunction with an operational amplifier.

FIG. 6 shows a block diagram of a low-pass filter which utilizes operational amplifier 40 in combination with RC circuits 41, 42; 43,44 and 45,46,47. This type of low-pass filter has the advantage of a very sharp cutoff so that signals associated with periods corresponding to sea motions are highly attenuated without appreciably distorting signals associated with the gravity variations. This type of low-pass filter whose elements have identical parameters is used for elements 17 and 25 in FIG. 4.

Figure 7:
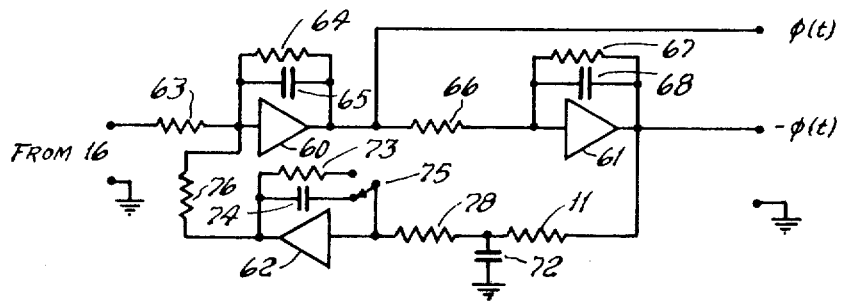
FIG. 7 is a schematic diagram of a high-pass filter which offers as an output both the filtered beam angle and the negative thereof.

FIG. 7 is a block diagram showing a unique high-pass filter which produces a filtered signal and an inverted counterpart. Amplifier 60 with input resistor 63 and feedback resistor 64 serves to increase the level of the input signal. Capacitor 65 has a very small value and serves to attenuate any high frequency noise. Amplifier 61 with input resistor 66 and the feedback loop consisting of resistor 67 and capacitor 68, which has a very small value, acts as an inverter. Amplifier 62 with capacitors 72 and 74 and resistors 70 and 71 acts as a low-pass filter. Since this low-pass filter provides feedback through the input resistor 76 to the amplifier 60, the entire circuit acts as a high-pass filter with two outputs with opposite phases. Resistor 73 which can be put into the circuit with a single-pole double-throw switch serves to discharge capacitor 74, a procedure used only while testing.

It will be appreciated that this type of high-pass filter is uniquely adapted for use in the crosscoupling computer since it provides efficient high-pass filtering in a case where simple blocking capacitors could not. The improvements over the computer shown in the 1966 article involve the use of operational amplifiers as filters, the use of a special high-pass filter which replaces the blocking capacitors shown in the above-mentioned article. Also shown in FIG. 4 are means for subtracting the crosscoupling accelerated from the filtered gravimeter signal.

What is claimed is:

1. Apparatus for computing crosscoupling errors introduced into the measurement of local gravitational fields by a beam gravimeter and for eliminating these errors from the gravity measurement, comprising;
    means for generating a signal having an amplitude proportional to accelerations to which said beam is subjected which are collinear with the longitudinal axis of said beam;
    means for multiplying said signal with a signal having an amplitude proportional to the angular orientation of said beam relative to a reference position;
    means having a transfer function corresponding to the mechanical damping function of said gravimeter for filtering the signal resulting from said multiplication; and
    means for subtracting said filtered signal from the signal generated by said gravimeter so as to produce a signal proportional only to said local gravitational field, whereby crosscoupling errors in the signal generated by said gravimeter are automatically eliminated from the gravity measurement.

2. Apparatus for computing crosscoupling errors introduced into the measurement of local gravitational fields at sea by a beam gravimeter and for eliminating these errors from the gravity measurement, comprising:
    means for measuring the beam deflection angle of said gravimeter and for generating a first signal whose amplitude is proportional to said deflection angle;
    means for generating a second signal having an amplitude proportional to accelerations collinear with the longitudinal axis of said beam to which the beam of said gravimeter is subjected;
    means for multiplying said first and second signals together to produce a crosscoupling error signal;
    means having a transfer function corresponding to the mechanical damping function of said gravimeter for filtering said crosscoupling error signal; and
    means for subtracting said filtered signal from said first signal so as to produce a signal proportional only to said local gravitational field, whereby crosscoupling errors in said first signal thereafter are automatically computed and eliminated from the gravity measurement.

3. The apparatus as recited in claim 2 wherein the high-frequency components of said first signal are attenuated immediately prior to multiplication with said second signal.

4. The apparatus as recited in claim 3 wherein said means for multiplying includes an analog multiplier requiring positive and negative representations of the two signals to be multiplied and wherein the high-frequency components of said first signal are attenuated by a high filter which generates positive and negative signals for use with said analog multiplier corresponding to positive and negative representations of said beam deflection absent any long term of DC components, said high-pass filter comprising:
    a reference potential;
    a first operational amplifier coupled to said first signal at a first input having a second input coupled to said reference potential,
        said amplifier having a high-pass filter in its feedback circuit, thereby coupling only high frequency signals back to said first input in phase with said first signal,
        the output of said first operational amplifier providing a positive representation of said beam deflection angle;
        means for inverting the output of said first operational amplifier to provide a negative representation of said beam deflection angle; and
    means for coupling low frequency components of said inverted signal to said first input such that said low frequency components are subtracted from the input signal to said first operational amplifier, causing said amplifier to amplify only high frequency components of said input signal,
        said last-mentioned means comprising a second operational amplifier having its output coupled to said first input having high-pass filter in the feedback path between its output and the input thereto for coupling only high frequency signals from its output to its input, and means for connecting the input to said second operational amplifier to said inverted signal, said means including a high-pass filter coupled between the input to said second operational amplifier and said reference potential for shunting the high frequency components of said inverted signal to said reference potential.

5. The apparatus as recited in claim 3 wherein said first signal and said filtered crosscoupling error signal are filtered by similar low-pass filters to remove signals associated with sea motions.

6. Apparatus for eliminating crosscoupling error from the output signal of a beam gravimeter introduced by the motion of a seagoing vessel within which said gravimeter is mounted, comprising
    means for producing from the output signal of said gravimeter an amplified signal whose magnitude is proportional to the angular position of the beam of said gravimeter;
    means for filtering high-frequency components from said amplified signal so as to remove any component due to heave of the vessel and produce a first signal representing the local gravitational filed and including acceleration due to crosscoupling;
    means for filtering low-frequency components from said first signal and for producing second and third signals corresponding, respectively, to the positive and negative components of the filtered positioned of said beam;
    means for generating fourth and fifth signals corresponding, respectively, to the positive and negative components of the horizontal acceleration to which said beam may be subjected in a direction colinear with the longitudinal axis of said beam;
    means for multiplying said second, third, fourth and fifth signals together so as to obtain an analog signal;
    means having a transfer function equal to the mechanical damping function of said gravimeter for filtering said analog signal so as to produce a sixth signal;
    means having the same filter characteristic as the means which filters high-frequency components from said amplified signal for filtering said sixth signal so as to produce a seventh signal; and
    means for subtracting said seventh signal from said first signal so as to develop an output signal corresponding to the gravitational acceleration unaffected by any crosscoupling error.